(12) United States Patent
Fernandes et al.

(10) Patent No.: US 8,126,970 B2
(45) Date of Patent: Feb. 28, 2012

(54) METHOD AND APPARATUS FOR ENGINEERING CHANGE MANAGEMENT

(75) Inventors: Rohan John Fernandes, Mangalore (IN); Peter Szincsak, Mannheim (DE); Ulf Petzel, Mannheim (DE)

(73) Assignee: SAP AG, Walldorf (DE)

( * ) Notice: Subject to any disclaimer, the term of this patent is extended or adjusted under 35 U.S.C. 154(b) by 779 days.

(21) Appl. No.: 11/643,508

(22) Filed: Dec. 20, 2006

(65) Prior Publication Data

US 2008/0155039 A1 Jun. 26, 2008

(51) Int. Cl.
*G06F 15/16* (2006.01)

(52) U.S. Cl. ........................................ 709/206; 709/207

(58) Field of Classification Search .................. 709/206, 709/207, 218, 223, 224
See application file for complete search history.

(56) References Cited

U.S. PATENT DOCUMENTS

| 7,305,392 | B1 * | 12/2007 | Abrams et al. ..................... 707/9 |
| 7,519,976 | B2 * | 4/2009 | Blevins ......................... 719/328 |
| 2002/0178229 | A1 * | 11/2002 | Sinha et al. .................... 709/206 |
| 2004/0111478 | A1 * | 6/2004 | Gross et al. .................... 709/206 |
| 2004/0143636 | A1 * | 7/2004 | Horvitz et al. ................. 709/207 |
| 2004/0230572 | A1 * | 11/2004 | Omoigui ........................... 707/3 |
| 2005/0108363 | A1 * | 5/2005 | Torigoe et al. ................ 709/218 |
| 2005/0144266 | A1 * | 6/2005 | Antonelli et al. .............. 709/223 |
| 2006/0092861 | A1 * | 5/2006 | Corday et al. ................ 370/256 |
| 2007/0129960 | A1 * | 6/2007 | Farrell, Jr. ........................ 705/1 |

* cited by examiner

*Primary Examiner* — Peling Shaw
(74) *Attorney, Agent, or Firm* — Kenyon & Kenyon LLP (57) ABSTRACT

A method for engineering change management, includes providing access to at least one notification template, the notification template including predefined information for providing notification information to at least one party and providing a system for managing notifications sent to parties, the notifications including information messages, wherein the notifications can be created using the at least one notification template.

24 Claims, 12 Drawing Sheets

User Selection

Note: 1 Users Added

User Selection

Enter at least one character and then choose *Search*. Choose *Add Search Result* to add all found users directly to the user list. Otherwise, you can add one user from the list of search results that appears. Then choose *Next*. The search term is compared to the first name, last name, user ID and the e-mail address.

User or User Group
Last Name
First Name
E-Mail
Add Search Result

170 — User [Next] [Cancel] [All] [None]
Name
☑ Nithya Kumar

Search

Figure 18

Functions

Competitive Scenarios
Collaborative Scenarios
Standards
Meetings
Received Notifications
Sent Notifications
Notification Templates
Status Management
Search
User Groups
User Administration
Network Administration
cFolders Administration
About cFolders Create

Navigation: Notification Template
Aktueller Pfad: Notification Templates > Authorizations

Assign an authorization to a user and then choose *Save* to add the user to the authorization list.

| Authorizations | | | Save Cancel |
|---|---|---|---|
| Owner | Administration | Write | Read |
| Nithya Kumar | ○ | ⊙ | ○ |

METHOD AND APPARATUS FOR ENGINEERING CHANGE MANAGEMENT

BACKGROUND

1. Technical Field

The present disclosure relates generally to engineering change management and, more particularly, to a method and apparatus for engineering change management.

2. Description of the Related Art

Engineering Change Management (ECM) allows a fast, effective and secure way of dealing with engineering change processes. Various meta-objects can be used for the management and control of the engineering change process. A change notification object can be used by a customer, for example, to report issues to a company via the web. The company can then use the change notification to check further into the issue and decide if any follow-up activities are required on its part. If it is decided that an engineering change may be needed, the feasibility and necessity of the change can then be determined by one or more parties in the company. If it is determined that the changes are feasible and necessary, an approval process is started. If everyone involved in the approval process approves the changes, the changes can then be made.

Figure 2A:
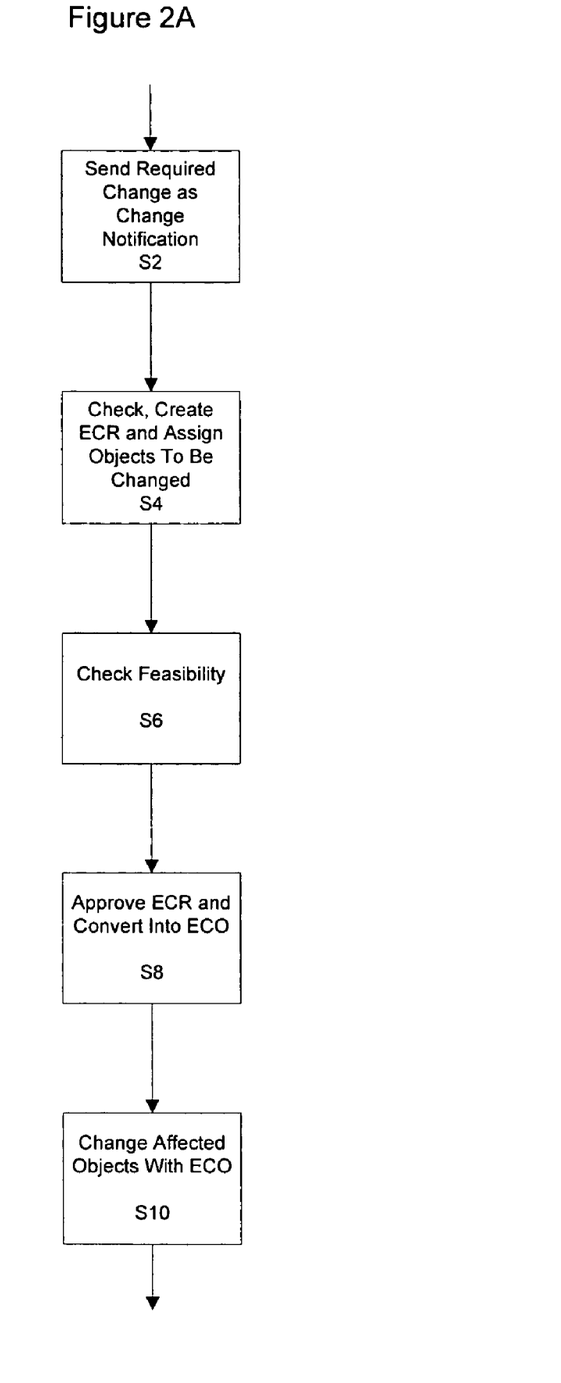
FIGS. 2A and 2B show a flow chart and block diagram, respectively, for describing aspects of engineering change management.
Figure 2B:
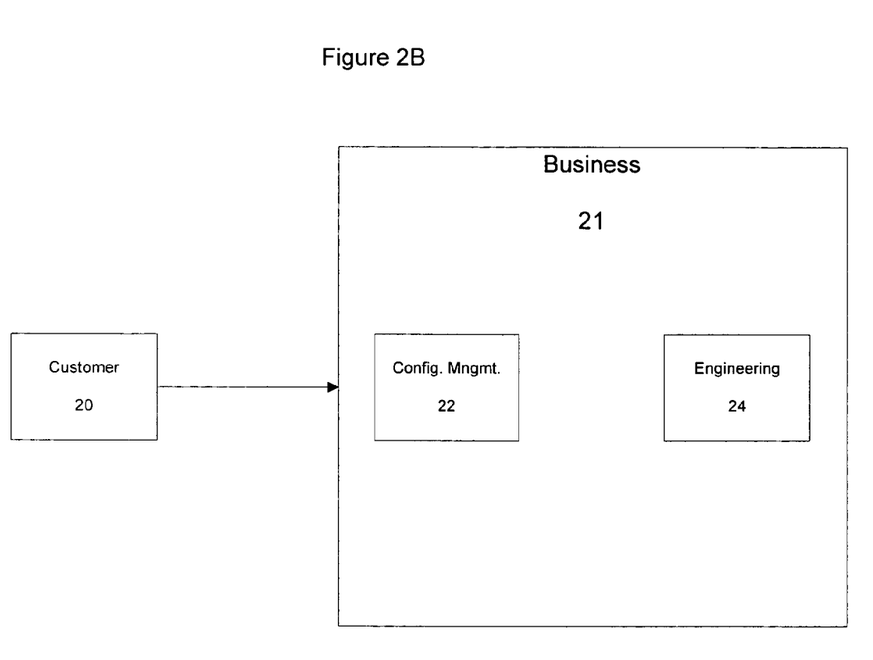

FIGS. 2A and 2B are a flow chart and a block diagram for describing in more detail, an example of the engineering change process. A customer 20 may be, for example, external partners or internal colleagues to business 21. Customer 20 is capable of communicating with business 21 using various types of communication systems including, for example, the World Wide Web. When customer 20 wants to report an issue with, for example, a product manufactured by business 21, customer 20 prepares and sends a change notification to business 21 via, for example, the World Wide Web (Step S2). The change notification then gets routed to configuration management 22. Although shown in one box as entities of business 21, configuration management 22 and/or engineering 24 may be separate companies or entities from business 21 that partner with each other.

Configuration management 22 reviews the change notifications, creates an engineering change request (ECR) and assigns objects that need to be changed (Step S4). For example, objects that need to be changed may include manuals, schematics, bills of material, etc. The ECR is then routed to designated parties in engineering 24 where the feasibility of the changes for the affected objects is checked (Step S6). If configuration management 22 is notified by engineering 24 that some or all of the changes are feasible, configuration management 22 approves the ECR and converts it into an engineering change order (ECO) (Step S8). The ECO is then routed to engineering 24 where the objects can be changed in accordance with the ECO (Step S10).

During the engineering change process, different parties with different roles are involved at different stages of the process. For example, different parties may be responsible and/or accountable for various stages of the process. In addition, parties may need to be consulted and/or kept informed about various stages of the process. Accordingly, different types of notifications may be made available at different stages of the process in order to trigger required actions or simply to keep people informed.

During the engineering process, users can generate and send notifications to inform responsible, consulted and/or informed users of the status of the process. The notification is a way of sending short information messages to other users. Notifications can be sent manually or automatically. In present systems, when a user wants to send a manual notification to another user, the user enters details of the notification (e.g., subject, priority and comment, etc.) each time they want to send the notification. The system can also be arranged to send automatic notifications where the text is fixed, except for the link that gives access to the object on which the notification is based.

There is a need for a notification system that is flexible in the information that can be entered and yet is easy and efficient to use.

SUMMARY

This application describes tools (in the form of methodologies, apparatuses, and systems) for engineering change management. The tools may be embodied in one or more computer programs stored on a computer readable medium or program storage device and/or transmitted in the form of a computer data signal in one or more segments via a computer network or other transmission medium.

A method for engineering change management, includes providing access to at least one notification template, the notification template including predefined information for providing notification information to at least one party and providing a system for managing notifications sent to parties, the notifications including information messages, wherein the notifications can be created using the at least one notification template.

A programmed computer apparatus for engineering change management, includes a module for providing access to at least one notification template, the notification template including predefined information for providing notification information to at least one party and a module for managing notifications sent to parties, the notifications including information messages, wherein the notifications can be created using the at least one notification template.

A computer recording medium including computer executable code for performing engineering change management, includes code for providing access to at least one notification template, the notification template including predefined information for providing notification information to at least one party and code for managing notifications sent to parties, the notifications including information messages, wherein the notifications can be created using the at least one notification template.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
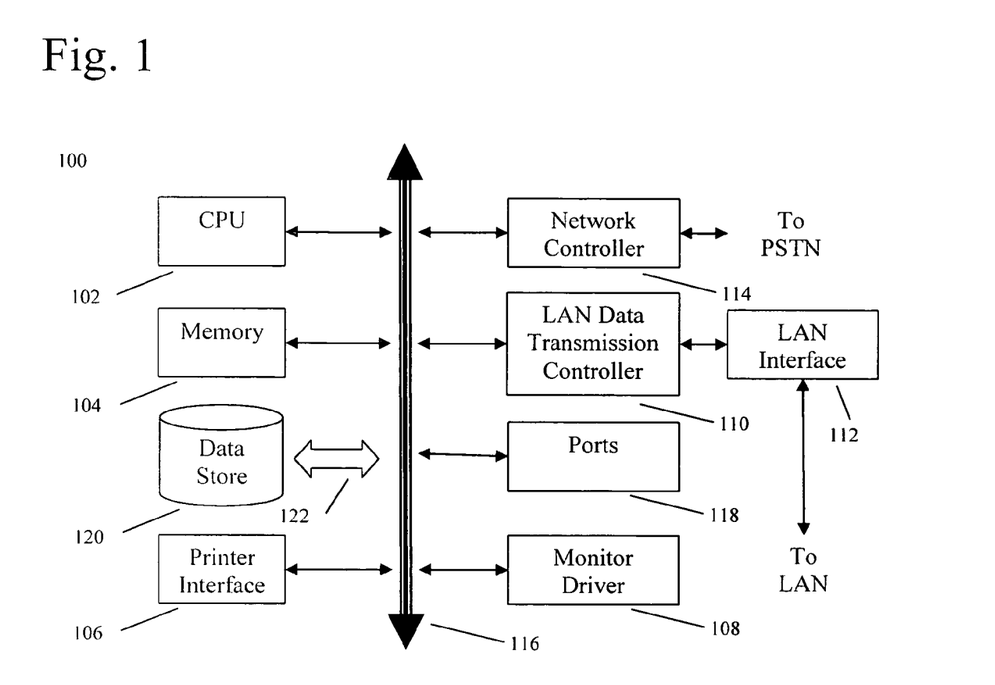
FIG. 1 shows a block diagram of an exemplary computer system capable of implementing the methods and systems of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

The present disclosure is concerned with, among other things managing notification templates and their use in manual notifications and status transitions.

The present disclosure is applicable to various types of design collaboration systems that allow external collaboration with partners and suppliers as well as internal collaboration between globally dispersed design teams. Embodiments of the present disclosure will be described with respect to the use of CFolders (Collaboration Folders) by SAP. However, it should be noted that the present disclosure is not limited thereto and may be applied to other such systems as well.

Figure 3:
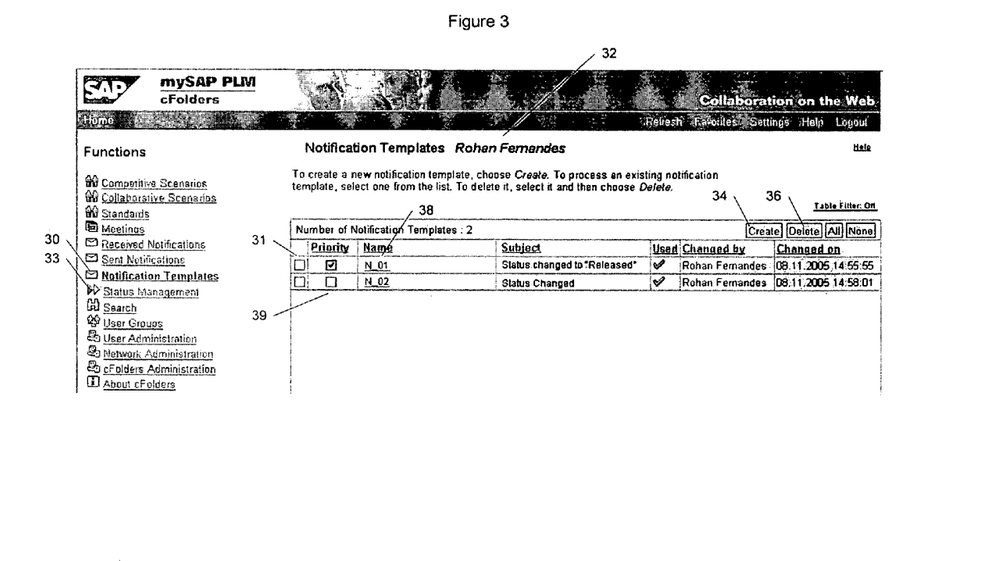
FIG. 3 shows a page for managing notification templates according to an embodiment of the present disclosure.

According to an embodiment of the present disclosure, notification templates are provided which can be used when sending notifications. As shown in FIG. 3, a link 30 is provided on the left side of a CFolders homepage for managing notification templates. By clicking link 30, the user is presented with the notification templates overview page 32. In the overview page 32, the user has options to review, create, delete and change notification templates.

Figure 4:
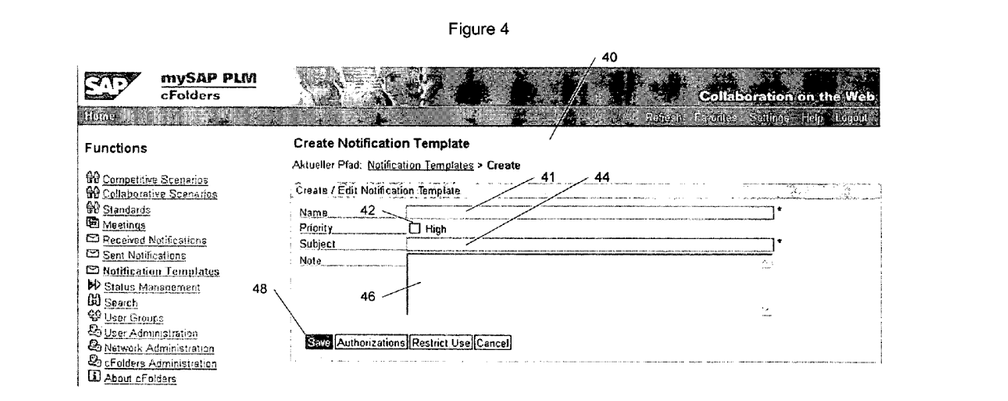
FIG. 4 shows an example a page for creating a notification template according to an embodiment of the present disclosure.

Notification templates can be created and used for automatic and manual notifications. Assuming that the user has authorization to view the notification templates overview and to create notification templates, after the user clicks the "Create" button 34, the user is presented with a Create Notification Template screen 40 as shown in FIG. 4. The user can then supply a name 41 for the template used to uniquely identify the template. The user can assign the notification as high priority by checking box 42. The user assigns a subject of the Notification Template by entering the subject in field 44. Examples of subjects can include "Validated," "Status changed," "Status Changed to Release," etc. The user can also enter comments into the note field 46. The user can then save the notification template by clicking save button 48. If the name 41 suggested by the user already exists, the system informs the user of the error, and prompts the user to specify a different name. The notification template is thus created and is visible in the list 39 of notification templates shown in overview page 32 (FIG. 3).

Figure 5:
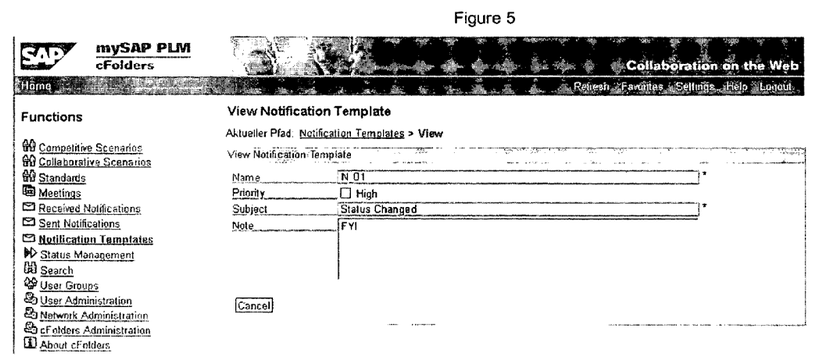
FIG. 5 shows an example of a page for viewing a notification template according to an embodiment of the present disclosure.

The user has an option to display and view a notification template. To display a notification template, the user clicks on a notification template name 38 in the list 39 displayed on overview page 32. Even if the user does not have authorization to modify this template, the selected notification template is displayed (see FIG. 5) in a read-only mode.

Figure 6:
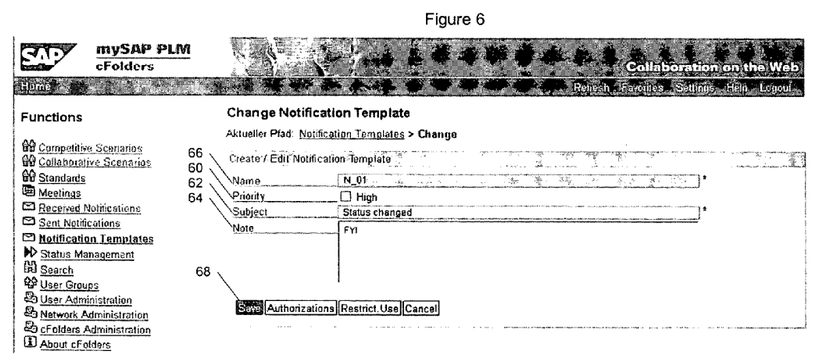
FIG. 6 shows an example of a page for changing a notification template according to an embodiment of the present disclosure.

Users are able to modify notification templates for which they have at least "Write" authorization. The user selects a notification template name 38 (FIG. 3) from the list 39 displayed on overview page 32 and clicks on the name. If the user has at least "write" authorization, the notification template is displayed (see FIG. 6) and the user can then make necessary changes to the notification template. According to an embodiment of the present disclosure, the user can modify only the priority field 60, subject field 62 and note field 64. That is, the user can not modify the name field 66. The user then saves the modified notification template by clicking save button 68.

Some notification templates can be deleted while others cannot. For example, a notification template used for automatic notifications (in status transitions) can not be deleted. The user having authorization to view the notification templates overview page and to delete a notification template can delete the notification template that was created for automatic and manual notifications. To delete a notification template, the user selects one or more of the notification templates by checking corresponding boxes 31 (FIG. 3) from the overview page 32 and clicks on the 'Delete' button 36. The system will then prompt whether the user really wants to delete those template(s). To continue with the deletion, the user clicks on an 'OK' button (not shown). According to an embodiment of the present disclosure, if a notification template has been assigned by a user for use in a status action or status transition action, deletion is not possible. Accordingly, the system deletes only the unused templates. If any of the notification templates were not deleted, a message is displayed to the user indicating that not all of the selected templates could be deleted and identifying the templates that could not be deleted.

Figure 7:
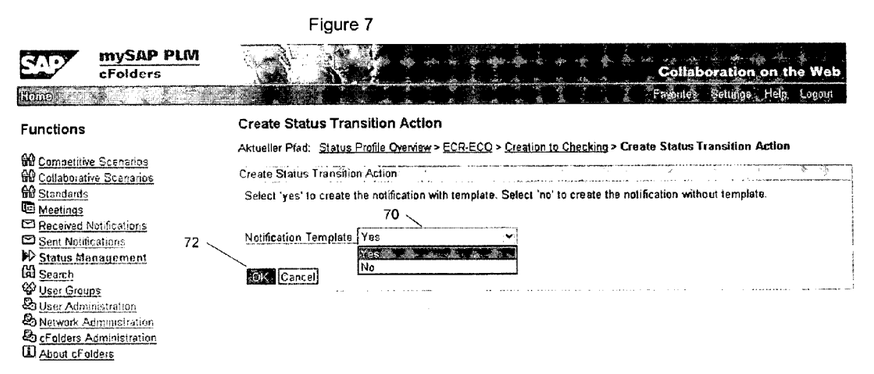
FIG. 7-12 show examples of pages for using notification templates according to various embodiments of the present disclosure.
Figure 8:
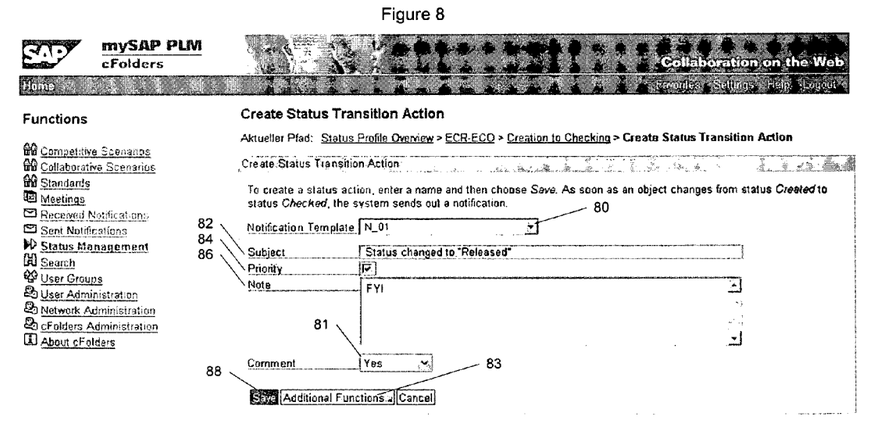
Figure 9:
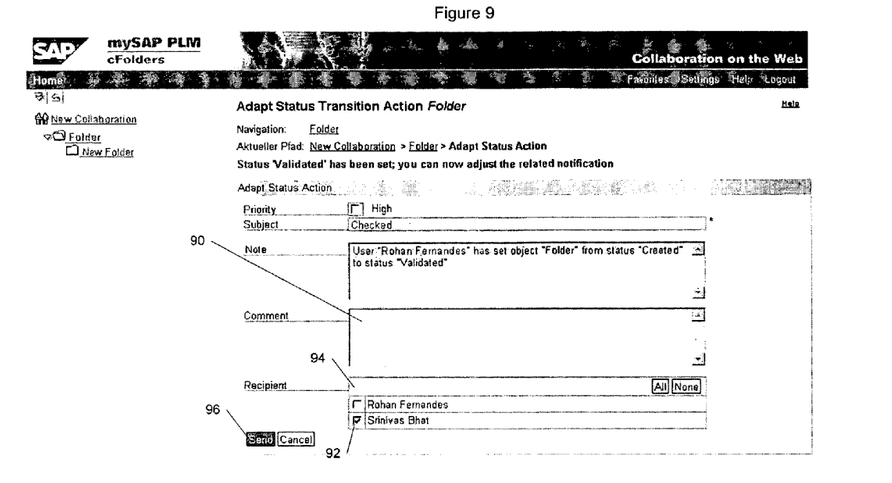

The user can perform status management by clicking on "Status Management" function 33 (FIG. 3). The user is then presented with an overview transition page as shown in FIG. 7. In this overview transition page, the user can create notification actions for transitions. The user has the option to either create a notification action based on a template or without use of a template by selecting "Yes" or "No" from dropdown menu 70 and clicking OK button 72. If the user selects NO, the notification templates are not used and the user is prompted to enter the required information. If the user selects YES, the user is presented with a Create Status Transition Action page as shown in FIG. 8. The list of notification templates are displayed in, for example, a dropdown list 80 allowing the user to, select a particular template from the dropdown list. According to an embodiment of the present disclosure, only those notification templates for which the user has at least read authorization are displayed in list 80. Once the user selects a particular template, the values for subject 82, priority 84 and note 86 are populated from the notification template. The user can then save the action by clicking "Save" button 88. According to an embodiment of the present disclosure, a dropdown menu entitled "Comment" 81 allows the user to add comments to the notification. 'Comment' dropdown menu 81 has 2 options, YES and NO. If "No" is selected, no comments are added. If "YES" is selected, when this status transition happens, a screen will appear on the user's computer system allowing the user to enter their comments in a Comment field 90 as shown in FIG. 9. This allows a user to adjust the related notification by adding information in the Comment field 90 as desired. According to an embodiment of the present disclosure, the present system is capable of logging comments added by users during status transitions. The system reads the text entered by the user in the Comment field 90. The system then logs the text under a "Comment" field of a status log. The comment entered by the user then appears in the 'comment' field of the status log. From this screen, the user can also check boxes 92 to select who receives the notification and can add recipients by entering them into "Recipient" field 94. Clicking the "send" button 96 will then send the notification to the designated recipients. The notification action is thus set so that whenever a status transition occurs, notifications are sent based on the set template.

Figure 10:
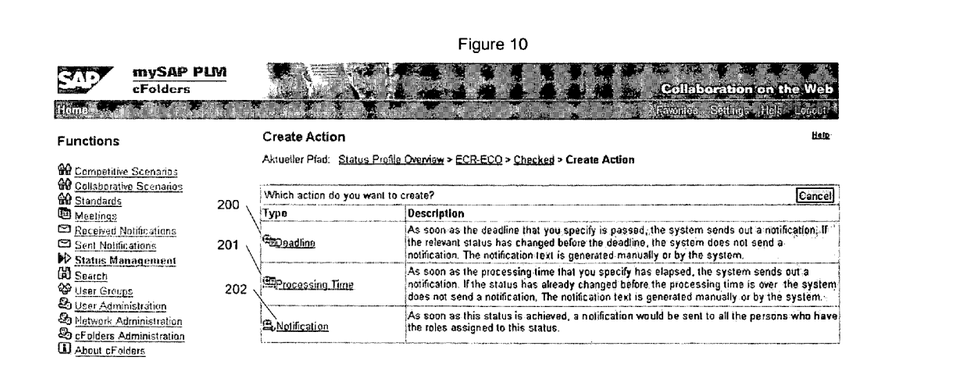

A status profile can have multiple statuses. A status transition is a transition from one of these statuses to another. Accordingly, a status transition has one initial status and one target status. By going into a status of a status profile, the user is presented with a Create Action page as shown in FIG. 10. This page allows the user to select from three different types of actions. Selecting the "Deadline" action 200, as soon as the deadline specified has passed, the system sends the notification. If the relevant status has changed before the deadline, the notification will not be sent. The notification text can be generated manually by the user or by the system using the selected notification template. Selecting the "processing time" action 201, as soon as the specified processing time has elapsed, the system sends out a notification. If the status has already changed before the processing time is over, the system does not send a notification. The notification text can be generated manually by the user or by the system using the selected notification template. Selecting the "Notification" action 202, as soon as the status is achieved, a notification is sent to all persons having roles assigned to the status. Once the user selects an action button (201-202), the user is presented with a page similar to that shown in FIG. 8, allowing the user to select a template from which the notification action is to be sent. The system populates the values for subject, priority and note using the chosen template. The user can then save the notification action.

Figure 11:
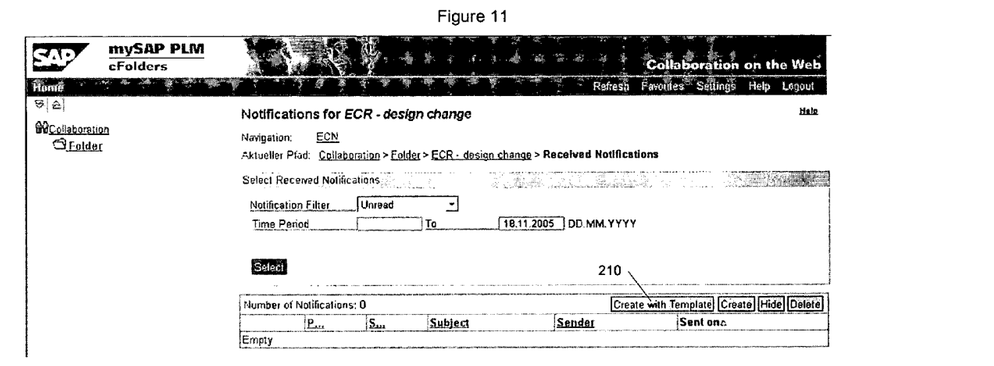
Figure 12:
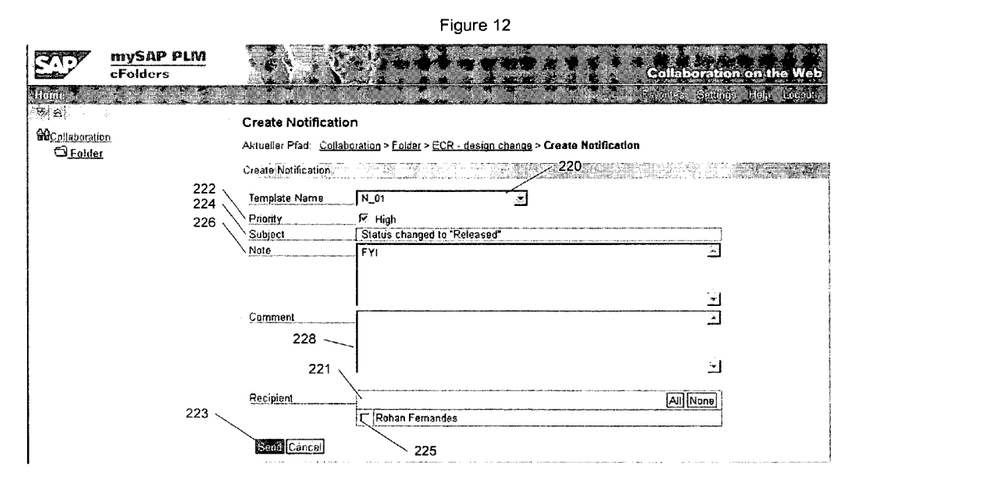

As noted above, the user can use the templates to create manual notifications. From a page such as that shown in FIG. 11, the user can set manual notifications. The user clicks the 'Create with Template' button 210. The user is then presented with a Create Notification page as shown in FIG. 12. The user selects a notification template from the dropdown menu 220 by selecting and clicking on a template name. The priority field 222, subject field 224 and note field 226 are then automatically populated with data from the selected template. According to an embodiment of the present disclosure, the user has an option to modify the subject field 224 only. In addition, the user has the option to add more comments in the comment field 228. The user selects recipients by checking boxes 225 and/or by adding the desired recipients in field 221. The user then sends the notification to those recipients by clicking on the 'Send' button 223.

As described above, users can be assigned authorization levels for notification templates so as to control the creation, deletion, modification or access to the templates. A user logs into the system and navigates to the overview screen and enters the desired data for the template. The user then navigates to the "Authorizations" section for the template. The user then selects user(s), user-group(s) or role(s) that need to be assigned authorization for the selected template. The user adds the selected entry and then selects an authorization for the entry. The authorization can be, for example, administrative or write or read. Only the selected user(s)/user-group(s)/role(s) then have necessary authorizations (administration, write or read) for that notification template.

Figure 13:
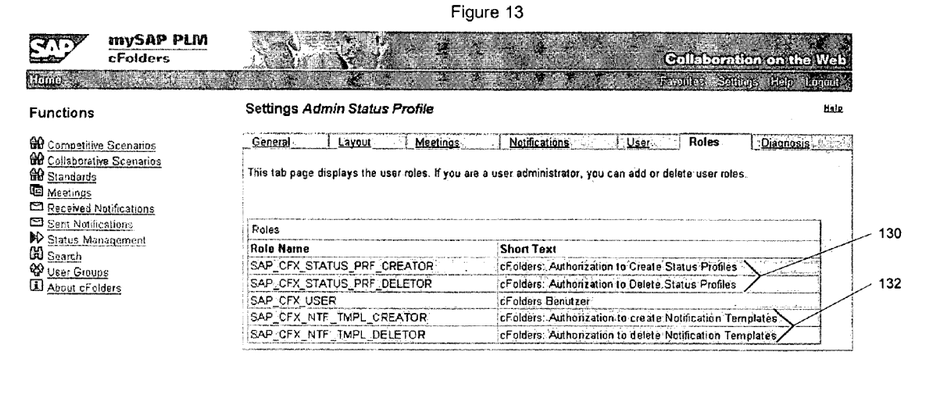
FIG. 13 shows an example of a page for viewing user roles according to an embodiment of the present disclosure.

The following is a more detailed description of how users can be granted various types of authorizations levels for the notification templates. For example, only a user having a "creator" role can create a notification template. In addition, only a user having a "deletor" role can delete a notification template. Examples of various user roles and authorizations are shown in FIG. 13. As shown, roles and authorizations can be assigned for status profiles 130 and notification templates 132. A user having administration authorization for a notification template can add or delete user roles for users of that template. The user who creates a notification template automatically gets "administration" authorization for that template giving them complete control of the notification template.

Figure 14:
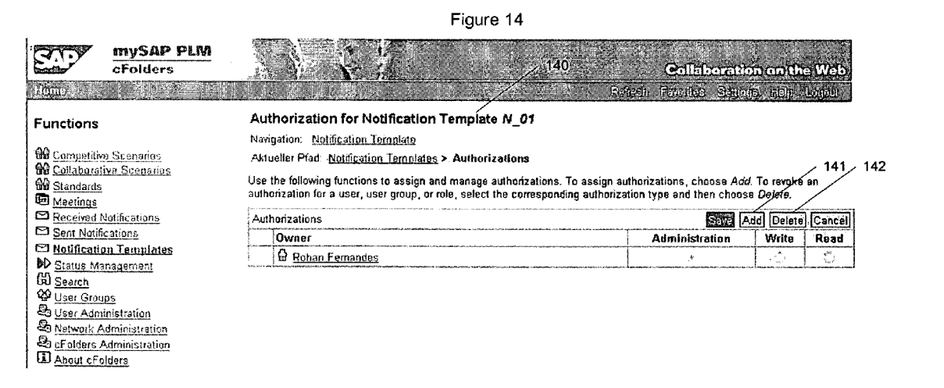
FIG. 14-19 show examples of pages for assigning and managing authorizations according to various embodiments of the present disclosure.
Figure 15:
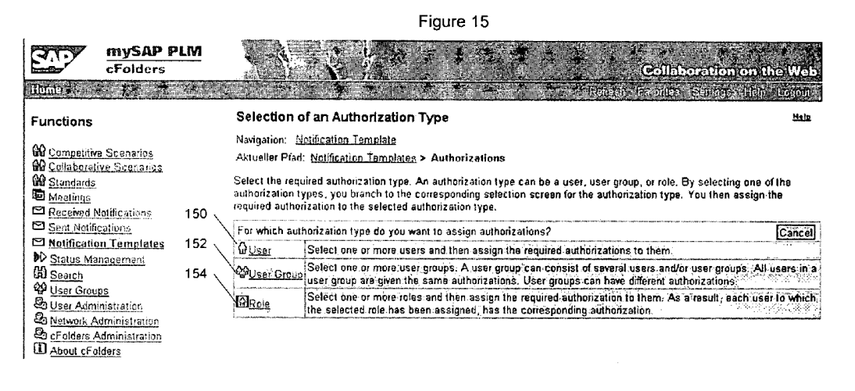

Authorization can be assigned for each notification template using an Authorization page as shown, for example, in FIG. 14. The name of the notification template being modified 140 is displayed to the user. Clicking on authorizations "Add" button 141 presents the user with a selection screen as shown in FIG. 15. This allows a user to select the required authorization type for the notification template. An authorization type can be a user 150, user group 152 or role 154. Selecting one of the authorization types will display a corresponding selection screen allowing the user to assign the required authorization to the selected authorization type. Clicking on "User" 150 allows the user to select one or more users and assign them the required authorizations. Clicking on "User Group" 152 allows the user to select one or more user groups which can consist of several users and/or user groups. All users in a user group are given the same authorizations. User groups can have different authorizations. Clicking on "Role" 154 allows the user to select one or more roles and to assign the required authorizations to those roles. Each user to which the selected role has been assigned then has the corresponding authorization.

Figure 16:
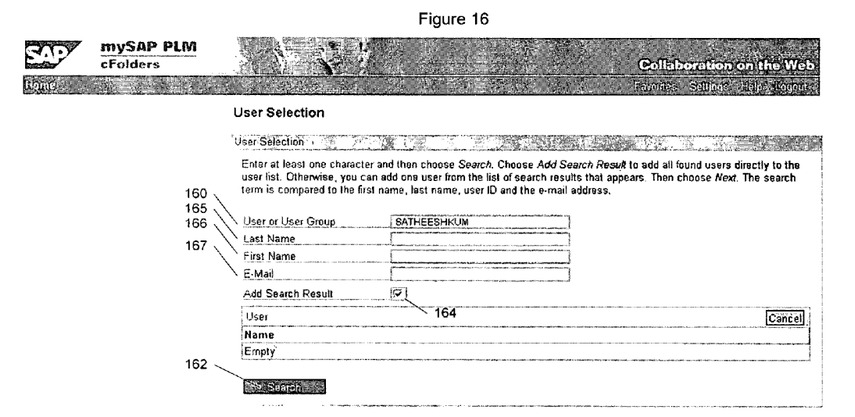
Figure 17:
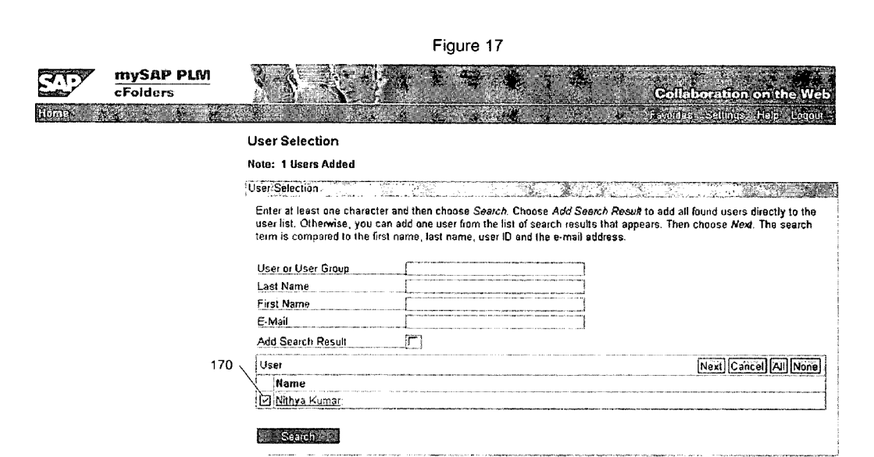
Figure 18:
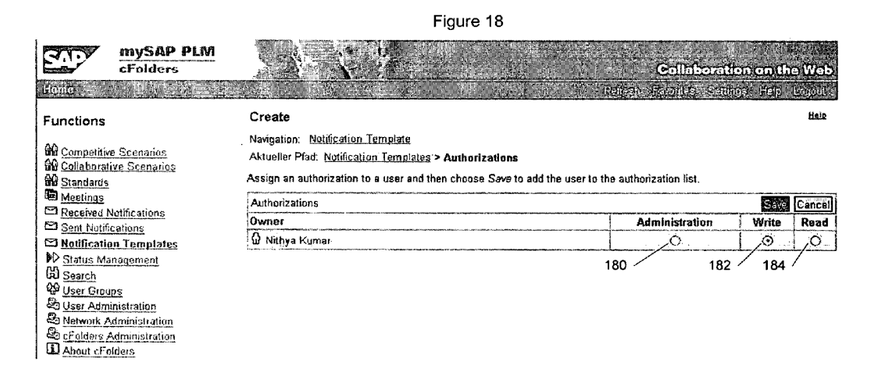
Figure 19:
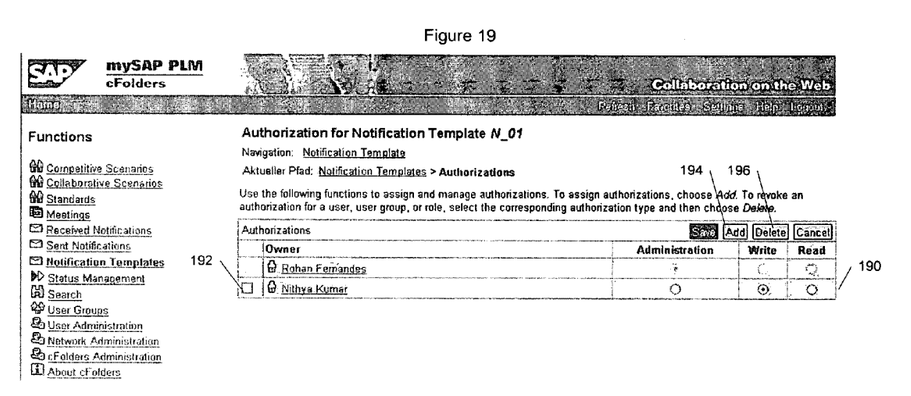

Clicking on user 150, displays a screen as shown in FIG. 16. The user can enter at least one character into the "User or User Group" field 160, "Last Name" field 165, "First Name" field 166 or "E-mail" field 167, and then click the Search button 162. Checking Add Search Result box 164, will add all the found users directly to the user list for the notification template. If box 164 is not checked, the list of users will be displayed and the user can select one or more users from the list by double clicking on their names. In the example shown in FIG. 17, one user 170 has been added. Clicking on that users name presents a screen as shown in FIG. 18. Checking the appropriate button (180, 182, 184) will assign administration, write or read privileges for that user to the notification template. FIG. 19 is similar to FIG. 14, but now includes a new user. The authorization fields 190 are displayed allowing the operator to view the authorization levels for each user. These authorization levels can be modified by checking box 192 and clicking on one of the authorization fields 190 and clicking the Add button 194 or Delete button 196.

The use of notification templates can be restricted so that the templates can be used only in certain cases. For example, according to an embodiment of the present disclosure, a notification template can be restricted to one of these three: statuses, status transitions and manual notifications. After the user logins into the system and has navigated to the notification templates overview screen and selected a template, the user navigates to a "Restrict Use" section for the template. The user then selects an option from the following options: status, status transition and manual notification. The user then saves the setting by clicking on a "Save" button. The notification template is then usable for only the selected option.

The present system can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the present system can be performed by one or more programmable processors executing a computer program to perform functions of the invention by operating on input data and generating output. Method steps can also be performed by, and apparatus of the disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the present disclosure, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The present system has been described in terms of particular embodiments. Other embodiments are within the scope of the following claims. For example, although the present system has been described as a component in a larger system, it can also be implemented in other systems or as a stand-alone system.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for engineering change management, comprising:
   providing access by a user to at least one notification template, the notification template including user selectable information, wherein the user has an option to review, create, delete and/or modify the at least one notification template to create at least one notification to be sent to parties at stages of an engineering change process;
   providing access to a status management user interface to the user, the status management user interface allowing the user to create a notification for a status transition based on the at least one notification template, wherein after the status transition happens, the notification template is to prompt the user to enter comments into a comment field just prior to the notification being sent;
   logging the comments into a status log; and providing a system for managing notifications sent to parties, wherein a notification is sent to at least one party at a stage of an engineering change process defined by the user.

2. The method of claim 1, wherein the user is provided with at least one of authorization to create at least one notification template, authorization to delete at least one notification template and authorization to change at least one notification template.

3. The method of claim 1, wherein the system for managing notifications sent to parties allows notifications to be sent automatically or manually.

4. The method of claim 3, wherein a user creates a notification to be sent automatically or manually, using the at least one notification template.

5. The method of claim 1, wherein the notification template comprises at least one of template name information, priority information and subject information.

6. The method of claim 3, wherein the notification comprises at least one of name information, priority information and subject information.

7. The method of claim 1, wherein the notification template can be restricted to its use in only specified situations.

8. The method of claim 7, wherein the specified situations comprise at least one of statuses, status transitions and manual notifications.

9. A programmed computer apparatus for engineering change management, comprising:
   a processor, and
   a computer recording medium including computer executable code executed by the processor for performing engineering change management, the computer recording medium comprising:
      code for providing access by a user to at least one notifications template, the notification template including user selectable information, wherein the user has an option to review, create, delete and/or modify the at least one notification template to create at least one notification to be sent to parties at stages of an engineering change process;
      code for providing access to a status management user interface to the user, the status management user interface allowing the user to create a notification for a status transition based on the at least one notification template, wherein after the status transition happens, the notification template is to prompt the user to enter comments into a comment field just prior to the notification being sent;
      code for logging the comments into a status log; and
      code for managing the notifications sent to parties, wherein a notification is sent to at least one party at a stage of an engineering change process defined by the user.

10. The programmed computer apparatus of claim 9, wherein the user is provided with at least one of authorization to create at least one notification template, authorization to delete at least one notification template and authorization to change at least one notification template.

11. The programmed computer apparatus of claim 9, wherein the system for managing notifications sent to parties allows notifications to be sent automatically or manually.

12. The programmed computer apparatus of claim 11, wherein a user creates a notification to be sent automatically or manually, using the at least one notification template.

13. The programmed computer apparatus of claim 9, wherein the notification template comprises at least one of template name information, priority information and subject information.

14. The programmed computer apparatus of claim 11, wherein the notification comprises at least one of name information, priority information and subject information.

15. The programmed computer apparatus of claim 9, wherein the notification template can be restricted to its use in only specified situations.

16. The programmed computer apparatus of claim 15, wherein the specified situations comprise at least one of statuses, status transitions and manual notifications.

17. A computer recording medium including computer executable code for performing engineering change management, comprising:
   code for providing access by a user to at least one notification template, the notification template including user selectable information, wherein the user has an option to review, create, delete and/or modify the at least one notification template to create at least one notification to be sent to parties at stages of an engineering change process;
   code for providing access to a status management user interface to the user, the status management user interface allowing the user to create a notification for a status transition based on the at least one notification template, wherein after the status transition happens, the notification template is to prompt the user to enter comments into a comment field just prior to the notification being sent;
   code for logging the comments into a status log; and
   code for managing the notifications sent to parties, wherein a notification is sent to at least one party at a stage of an engineering change process defined by the user.

18. The computer recording medium of claim 17, wherein the user is provided with at least one of authorization to create at least one notification template, authorization to delete at least one notification template and authorization to change at least one notification template.

19. The computer recording medium of claim 17, wherein the code for managing notifications sent to parties comprises code for allowing notifications to be sent automatically or manually.

20. The computer recording medium of claim 19, wherein a user creates a notification to be sent automatically or manually, using the at least one notification template.

21. The computer recording medium of claim 17, wherein the notification template comprises at least one of template name information, priority information and subject information.

22. The computer recording medium of claim 19, wherein the notification comprises at least one of name information, priority information and subject information.

23. The computer recording medium of claim 17, wherein the notification template can be restricted to its use in only specified situations.

24. The computer recording medium of claim 23, wherein the specified situations comprise at least one of statuses, status transitions and manual notifications.

* * * * *